United States Patent [19]

Hoge

[11] 4,076,192
[45] Feb. 28, 1978

[54] APPARATUS FOR DETECTING A HIGH FLANGE

[76] Inventor: Myron W. Hoge, 1345 N. Broad St., Fremont, Nebr. 68025

[21] Appl. No.: 755,528

[22] Filed: Dec. 30, 1976

[51] Int. Cl.² .............................................. B61L 13/04
[52] U.S. Cl. ............................. 246/247; 116/114 AH; 116/124 R
[58] Field of Search .................. 116/56, 114 Q, 28 R, 116/124 R, 114 AH; 246/246–247, 313, 292, 250, 294

[56] References Cited

U.S. PATENT DOCUMENTS

| 1,100,957 | 6/1914 | Davis | 246/250 X |
| 1,543,005 | 6/1925 | Guth | 246/292 |
| 1,641,855 | 9/1927 | Lamont | 246/313 X |
| 2,002,881 | 5/1935 | Bretschneider | 246/313 X |
| 2,046,157 | 6/1936 | Gibbs | 246/247 X |

FOREIGN PATENT DOCUMENTS 793,153  1/1936  France .................................. 246/247

*Primary Examiner*—Daniel M. Yasich
*Attorney, Agent, or Firm*—Henderson, Strom & Sturm

[57] ABSTRACT

Apparatus for detecting a high flange on the wheel of a railroad car having a base member secured to the track; an upright element secured to the base member; an L-shaped unit, having a horizontal arm positioned adjacent to the track and a vertical leg extending underneath the base member, pivotally connected to the upright element; and a signal device connected to the leg of the L-shaped unit for giving a visual signal when a flange having an excessive depth passes over the arm and displaces the arm thereby moving the leg to activate the signal device.

2 Claims, 5 Drawing Figures

APPARATUS FOR DETECTING A HIGH FLANGE

BACKGROUND OF THE INVENTION

The present invention relates generally to a signal device for use in the railroad system, and more particularly to a device for detecting a high flange on a railroad car wheel as it moves along the track rail.

In recent years, there has been great concern over the decline in the U.S. railroad system. The decline has been in both quality and service which are, in the end, directly related to each other. One of the major factors behind the decline in the quality of the system is the high cost of maintenance, which the railroad companies have not been able to afford in view of their declining profits.

A major problem area of the maintenance on the railroad system is the detecting of normal and irregular wear in the system. This is particularly true for the wheels on which the railroad cars travel. The typical railroad wheel consists of a flat portion with a flange having a uniform depth attached to one side. The flat portion rides on the top of the rail with the flange extending along one side of the rail. Over a period of time, the flat portion will gradually wear thus causing the flange to grow larger. Therefore, an indication of the wear experienced by the railroad wheel may be given by the depth of the flange along side of the wheel. High flanges could very well result in derailments as the flange passes over switches and in turn tear up ties and tracks.

Over a period of years, various devices have been developed to provide an indication of normal and irregular wear of a railroad wheel. However, these devices have generally been mechanically complex and often times large and very heavy; thus preventing them from being freely portable. Further, these required in some instances to be mounted in a fixed location to properly function. This would greatly diminish their usefulness since a car on which wheel wear was to be checked would have to pass over this special track or several devices could be mounted on a series of tracks in a railroad yard again adding to the cost problem. Other devices, recently introduced, have involved electrical circuits which further add to the problem of reliability and repair since typically this equipment is subject to hard use and physical abuse. Some devices, while being portable, do require more than a single operator which again complicates the problem of trying to keep the costs down.

Therefore, there is a definite need for a device which has the capabilities of accurately measuring the depth of the flange of a railway wheel while also being relatively inexpensive, reliable, and freely portable.

SUMMARY OF THE INVENTION

In accordance with the present invention, a base member is secured to and disposed underneath the railroad track. An upright unit is secured to the base member and also positioned approximate to the track. An L-shaped unit is pivotally connected to the upright unit with the L-shaped unit having a normally horizontally disposed arm and a normally vertically disposed leg. A flag element is secured to the leg such that when a wheel having a high flange passes over the high flange detector, the high flange will contact the horizontally disposed arm of the L-shaped unit, thereby causing it to be displaced which will move the vertical leg thereby causing the flag to be displaced and provide a visual signal to the attendant.

An object of the present invention is the provision of a high flange detector which is simple in construction, highly reliable to use and readily movable from one location to another.

Another object of the present invention is the provision of a high flange detector which is reliable and will readily indicate a high flange.

Yet another object of the present invention is the provision of a high flange detector which may be operated without an external source of power;

Yet another object of the present invention is the provision of a high flange detector which is inexpensive to manufacture and to use.

Other objects, advantages, and novel features of the present invention will become apparent from the following detailed description of the invention when considered in conjunction with the accompanying drawings.

DESCRIPTION OF THE PREFERRED EMBODIMENT

Figure 1:
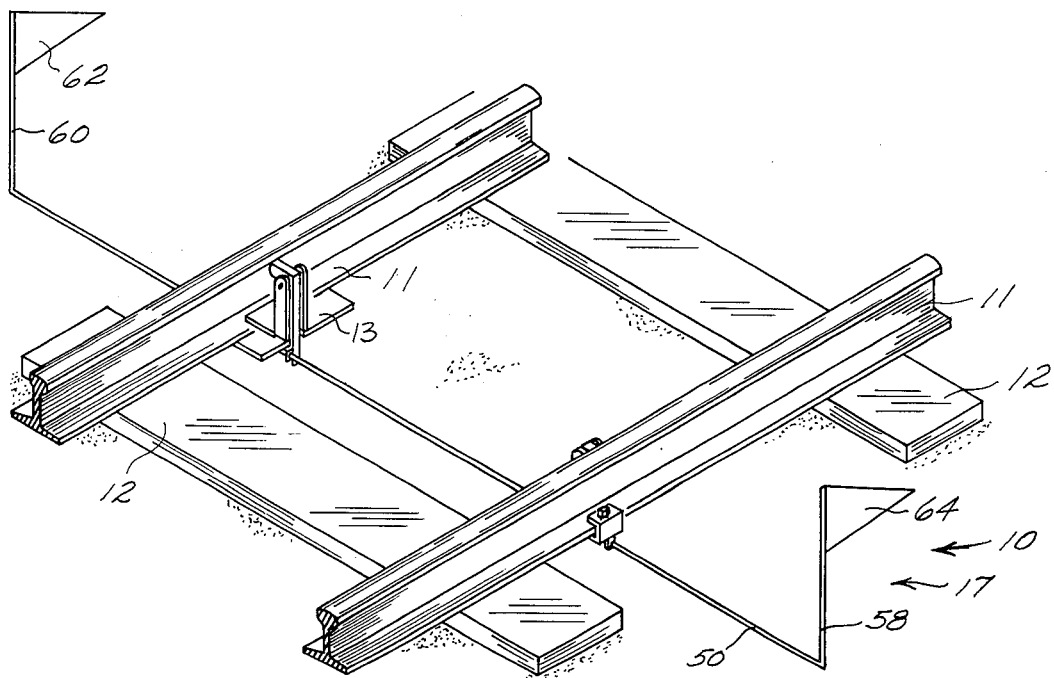
FIG. 1 is a perspective view of the high flange detector in position on a railroad track.

Referring now to the drawings wherein like reference numerals designate identical or corresponding parts throughout the several views, FIG. 1 illustrates the high flange detector shown generally at 10 secured to and positioned adjacent to a pair of railroad tracks 11 and between a pair of railroad ties 12.

Figure 2:
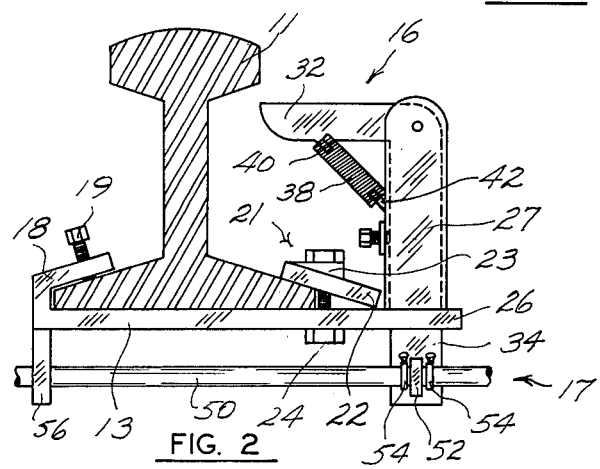
FIG. 2 is a side elevational view of the high flange detector.
Figure 3:
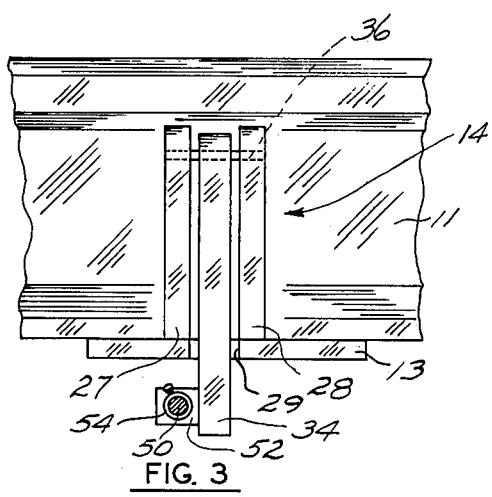
FIG. 3 is an end elevational view of the high flange detector.
Figure 4:
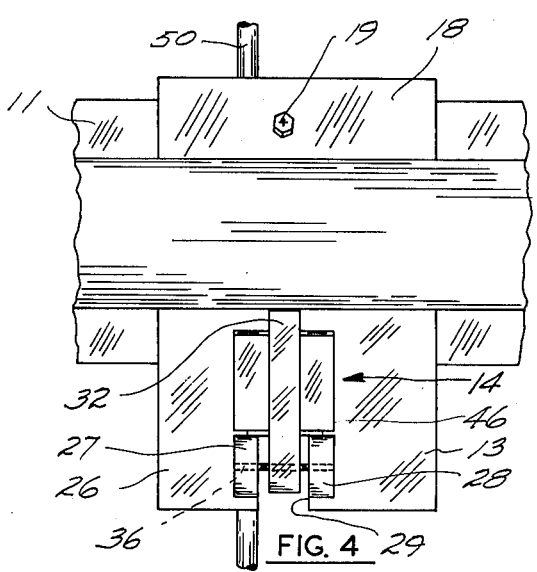
FIG. 4 is a top plan view of the high flange detector.

As illustrated in FIGS. 2-4, the high flange detector generally includes a base member 13 to which is secured an upright element 14. A pivotal unit 16 is pivotally connected to the upright element 14 and operatively connected to a flag element 17 which serves as a signalling device.

Specifically, the base 13 is formed from the metal plate and is positioned underneath a single track 11 and between two railroad ties 12. One end 18 of the base member 13 is formed so as to wrap around one side of the base of the track 11. At this end, a locking device 19 is threadably received by the base member 13 and is tightened against the base of the track 11, thereby securing one side of the base member 13 to the track 11. The base member 13 also extends underneath the track 11 and outward from the side of the track for a short distance. A second locking device 21, including a plate 22, washer 23, and a nut and bolt assembly 24, securely holds the other end 26 of the base member 12 against the base of the track 11 and prevents the base member 13 from moving in either direction with respect to the railroad track 11.

The upright element 14 as illustrated in FIGS. 3 amd 4, includes two parallel, vertically disposed posts 27 and 28 respectively. The posts 27 and 28 are spaced apart and positioned on opposite sides of a slot 29 formed in the other end 26 of the base member 13.

The pivotal unit 16 (FIGS. 2-4) includes a normally horizontally disposed arm 32 and a normally vertically disposed leg 34. The pivotal unit 16 is positioned between the posts 27 and 28 comprising the upright element 14 and is pivotally connected thereto by a pin 36. The vertical leg 34 passes through the slot 29 and extends underneath the base member 13. The L-shaped unit is generally disposed at right angles to the base member 13 and the railroad track 11 by a biasing element 38 which is secured to the horizontal arm 32 by a finger 40 and at its bottom to the upright element 14 by a finger 42. The vertical position of the horizontal section 32 with respect to the track 11 is controlled by an adjustable device 44. The device 44 includes a plate 46 mounted to the upright element 14 and extends between its two posts 27 and 28. A threaded bolt 48 is threadably received by the plate 46 and may be adjusted to contact the vertical leg 34 at various depth settings with respect to the plate. As the screw 48 is turned, it extends further out of the plate 46 and forces the vertical leg 34 to rotate about the rod 36. This, in turn, causes the horizontal arm 32 to move downward thereby increasing the distance between its top and the top of the railroad track 11. The biasing element 38 insures that without external pressure being applied to the horizontal arm 32, the vertical leg 34 will nest against the end of the screw 48.

The high flange detector 10 can be adjusted to detect varying degrees of wear on the railroad wheel which is represented by the depth of the flange. As discussed above the adjustable device 44 changes the relative distance between the top of the track 11 and the top of the horizontal arm 32. Therefore, if a wear factor represented by a flange depth of one inch is to be detected, the adjustable device 44 is changed until the distance from the top of the track 12 to the top of the horizontal arm 32 is 1 inch.

The flag element 17 (FIGS. 1 and 2) includes a rod 50 which is operatively connected to the vertical leg 34 by a bracket 52 and two collar devices 54. The bracket 52 contains an oversized aperture through which the rod 50 passes. The collar devices 54 are positioned on both sides of the bracket 52 and prevent the rod 50 from sliding through the aperture of the bracket 52. This arrangement permits the rod to be adjustably connected to the vertical leg 34 and in most case permit the rod to remain horizontal with respect to the base member when the vertical leg 34 is displaced. The rod 50 passes through a second bracket 56 positioned on the opposite end of the base member 14 and the ends thereof extend outwardly from the track bed on both sides for a short distance. Located on both ends of the rod 50 are vertical staffs 58 and 60, and secured to the free ends of the staffs are flags which serve as a visual signalling device.

Figure 5:
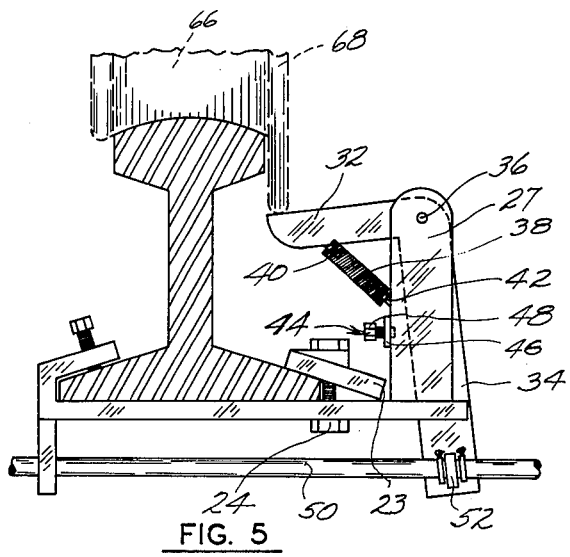
FIG. 5 is a side elevational view illustrating a railroad wheel having a flange of excessive length passing over the invention with the flange depressing the arm of the L-shaped unit.

As illustrated in FIG. 5, when a wheel 66 having a flange 68 having an excessive depth passes over the high flange detector 10, the flange will contact the horizontal arm 32 and cause it to be depressed by pivoting about the pin 36. As the horizontal section 32 moves downward, the vertical leg 34 is moved outward which in turn causes the rod 50 to move laterally with respect to the track 12 and to move the flags 62 and 64 thereby producing a visual signal.

As is readily seen, the high flange detector 10 functions under a simple principle of operation and has only a minimum number of moving parts. Further, the detector is light weight and may be easily moved from one location to another by loosening the two locking devices 22 and 24 from the base member 13 and removing the detector 10 from the track.

Obviously, many modifications and variations of the present invention are possible in light of the above teachings. It is therefore to be understood that, within the scope of the appended claims, the invention may be practiced otherwise than as specifically described.

I claim:

1. An apparatus for detecting a high flange on the wheel of a railroad car as the wheel moves over a railroad track, the apparatus comprising:

a base means including a base member secured to the track and an upright member secured to said base member;

an L-shaped unit pivotally secured to said upright member proximate the track in a position to be displaced from a first position to a second position by a high flange, said L-shaped unit in said first position having a generally horizontal arm positioned to be generally in the path of said high flange and a generally vertical leg depending from said arm;

biasing means interconnected between said base means and said L-shaped unit for biasing said L-shaped unit to said first position; and signal means including an elongated rod operatively connected to said L-shaped unit and affixed intermediate its ends to said upright member with one end of said rod extending laterally of one side of the track and the other end of said rod extending laterally of the other side of the track, and a pair of flags each secured to an end of said rod, wherein movement of said L-shaped unit from said first to said second position causes said rod to move with said flags giving a visual signal of the movement.

2. An apparatus for detecting a high flange as defined in claim 1 and said base member has a slot formed therein and said upright member includes a pair of spaced posts secured to said base member with said slot disposed therebetween; said leg having an end extending through said slot, and said rod is connected to said leg one end below said slot.

* * * * *